United States Patent
Yamaguchi et al.

(10) Patent No.: US 10,014,815 B2
(45) Date of Patent: Jul. 3, 2018

(54) CONTROL APPARATUS AND CONTROL METHOD OF AC ROTARY MACHINE

(71) Applicant: Mitsubishi Electric Corporation, Tokyo (JP)

(72) Inventors: Shingo Yamaguchi, Tokyo (JP); Michitaka Fujiwara, Hyogo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/450,243

(22) Filed: Mar. 6, 2017

(65) Prior Publication Data

US 2017/0310269 A1    Oct. 26, 2017

(30) Foreign Application Priority Data

Apr. 22, 2016    (JP) .................................. 2016-085776

(51) Int. Cl.
*H02P 27/04* (2016.01)
*H02P 29/024* (2016.01)
(Continued)

(52) U.S. Cl.
CPC .......... *H02P 29/0241* (2016.02); *B60L 3/003* (2013.01); *H02P 6/14* (2013.01); *H02P 27/06* (2013.01)

(58) Field of Classification Search
CPC ...... H02P 1/00; H02P 3/00; H02P 6/00; H02P 21/00; H02P 27/04; H02P 27/06; H02P 23/00; H02P 25/00; H02P 6/14
(Continued)

(56) References Cited

U.S. PATENT DOCUMENTS

| 7,352,143 B2* | 4/2008 | Inaba | H03K 19/00376 318/139 |
| 8,410,745 B2* | 4/2013 | Hosoda | B60L 3/003 318/800 |

(Continued)

FOREIGN PATENT DOCUMENTS

| JP | 2002-199744 A | 7/2002 |
| JP | 2008-220045 A | 9/2008 |
| WO | 2008/129658 A1 | 10/2008 |

OTHER PUBLICATIONS

Communication dated Jun. 13, 2017 from the Japanese Patent Office in counterpart Application No. 2016-085776.

*Primary Examiner* — Antony M Paul
(74) *Attorney, Agent, or Firm* — Sughrue Mion, PLLC; Richard C. Turner

(57) ABSTRACT

When an abnormality is detected by an abnormality detection unit, a first switching stop device turns OFF all of switching elements connected to one arm of either an upper arm or a lower arm of a power converter, and turns ON all of the switching elements connected to the arm, which are not turned OFF; when the abnormality is continuously detected even after operating the first switching stop device, a second switching stop device turns ON or turns OFF the switching elements connected to the upper arm and the lower arm so that the turn-ON and the turn-OFF are reversed to the operation by the first switching stop device; and when the abnormality is continuously detected even after operating the second switching stop device, a third switching stop device turns OFF all of the switching elements in the upper arm and the lower arm.

9 Claims, 2 Drawing Sheets

(51) Int. Cl.
*B60L 3/00* (2006.01)
*H02P 6/14* (2016.01)
*H02P 27/06* (2006.01)

(58) Field of Classification Search
USPC ..... 318/599, 799, 800, 801, 400.27; 363/40,
363/44, 95, 120, 175; 361/5, 22, 23
See application file for complete search history.

(56) References Cited

U.S. PATENT DOCUMENTS

2010/0036555 A1 2/2010 Hosoda et al.
2010/0060222 A1 3/2010 Kezobo et al.

* cited by examiner

CONTROL APPARATUS AND CONTROL METHOD OF AC ROTARY MACHINE

BACKGROUND OF THE INVENTION

1. Field of the Invention

The present invention relates to control apparatuses and control methods of alternating current (AC) rotary machines and, more particularly, relates to a control apparatus and a control method of an AC rotary machine, which are provided with a protection device and a protection method when an abnormality occurs in switching elements.

2. Description of the Related Art

A control apparatus of an AC rotary machine, which is mounted on an electric vehicle such as an electric car and a hybrid car and is connected to a driving AC rotary machine, has electric power conversion functions in which direct current (DC) power for driving the AC rotary machine, the DC power being supplied from a DC power source, is converted into AC power and AC power generated from the AC rotary machine is converted into DC power for charging the DC power source.

In order to actualize the electric power conversion functions such as this, the control apparatus of the AC rotary machine generally uses switching elements such as a metal-oxide-semiconductor field-effect transistor (MOSFET).

In the case of the electric vehicle mounted with a permanent magnet type synchronous rotary machine, an induced voltage generated from magnets attached to a rotor increases with an increase in the number of revolutions of the AC rotary machine. There is provided a device in which the induced voltage is suppressed so as not to exceed a breakdown voltage of the switching element and the like by the control apparatus of the AC rotary machine. For example, in an inverter protection method and a device thereof of Patent Document 1, either all of switching elements in an upper arm connected to the high voltage side of a DC power source or switching elements in a lower arm connected to the low voltage side of the DC power source are made to be an ON state to be brought into a three phase short circuit state, thereby circulating a current between an AC rotary machine and a control apparatus of the AC rotary machine to suppress an overvoltage.

PRIOR ART

Patent Document 1: JP2002-199744A

Even when a short circuit failure in which there occurs that the switching elements are remained in the ON state, the three phase short circuit state is brought about in order to suppress the overvoltage. However, a problem exists in that since all of the switching elements in the arm of either the upper arm or the lower arm are turned ON in the inverter protection method and the device thereof of Patent Document 1, if the three phase short circuit in which all of the switching elements in the lower arm are turned ON when the short circuit failure occurs in, for example, any of the switching elements in the upper arm, it continuously causes a short circuit in the DC power source in a phase where the switching element, in which the short circuit failure occurs, exists.

SUMMARY OF THE INVENTION

The present invention has been made to solve the foregoing problem, and an object of the present invention is to provide a control apparatus and a control method of an AC rotary machine, which prevent a continuous short-circuit of a DC power source due to a simultaneous turn-ON of switching elements in an upper arm and a lower arm in the case of being brought into a three phase short circuit state.

According to the present invention, there is provided a control apparatus of an AC rotary machine, the control apparatus including: an electric power converter which has switching elements connected to an upper arm and switching elements connected to a lower arm, and supplies a drive current to each phase of the AC rotary machine; and an abnormality detection device that detects an abnormality in the AC rotary machine or the control apparatus of the AC rotary machine. The control apparatus includes: a first switching stop device in which when the abnormality is detected by the abnormality detection device, all of a plurality of the switching elements connected to one arm of either the upper arm or the lower arm are turned OFF and all of a plurality of the switching elements connected to the arm, which are not turned OFF, are turned ON; and a second switching stop device in which when the abnormality is continuously detected by the abnormality detection device even after operating the first switching stop device, the switching elements connected to the upper arm and the lower arm are turned ON or turned OFF so that the turn-ON and the turn-OFF are reversed to the operation by the first switching stop device.

According to the control apparatus of the AC rotary machine according to the present invention, a continuous short-circuit of a DC power source due to a simultaneous turn-ON of the switching elements in the upper arm and the switching elements in the lower arm can be prevented in the case of being brought into a three phase short circuit state. Furthermore, there can be performed a detection as to which switching elements are abnormal, the switching elements in the upper arm or the switching elements in the lower arm.

The foregoing and other object, features, aspects, and advantages of the present invention will become more apparent from the following detailed description of the present invention when taken in conjunction with the accompanying drawings.

DETAILED DESCRIPTION OF THE INVENTION

Embodiment 1

Figure 1:
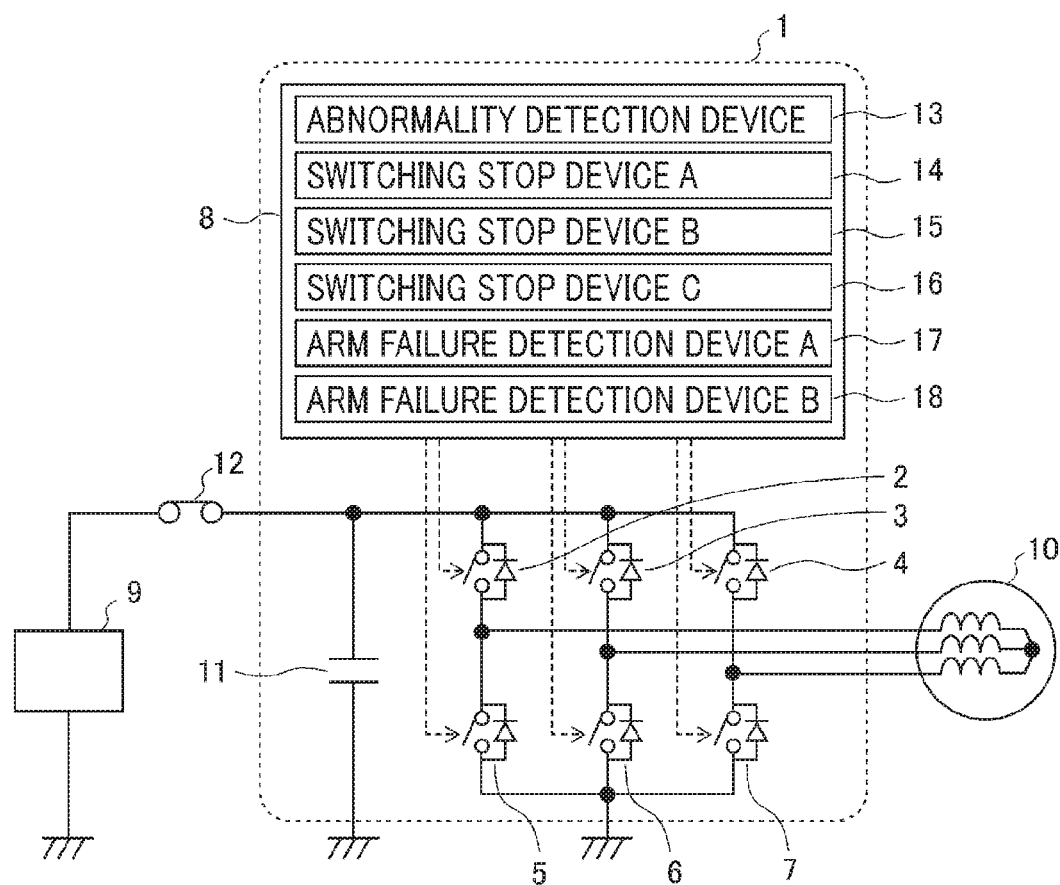
FIG. 1 is a schematic configuration view showing a control apparatus of an AC rotary machine according to Embodiment 1 of the present invention.

FIG. 1 shows the schematic configuration of a control apparatus of an AC rotary machine according to Embodiment 1 of the present invention.

Incidentally, a control method of the AC rotary machine according to the present invention will also be described in the operation of the control apparatus of the AC rotary machine.

A control apparatus 1 of an AC rotary machine has an electric power converter (also referred to as an "inverter control apparatus") which is composed of three sets of a set of a switching element 2 in an upper arm and a switching element 5 in a lower arm, a set of a switching element 3 in the upper arm and a switching element 6 in the lower arm, and a set of a switching element 4 in the upper arm and a switching element 7 in the lower arm. Then, the control apparatus 1 is an apparatus in which DC power obtained from a DC power source 9 is converted into AC power or AC power obtained from an AC rotary machine 10 is converted into DC power by turning ON/OFF the respective switching elements 2 to 7 by instruction of a microcomputer 8 serving as an electric power converter control section (also referred to as an "inverter control section").

A smoothing capacitor 11 is provided to smooth a surge voltage that is generated during ON/OFF switching of the switching elements 2 to 4 in the upper arm and the switching elements 5 to 7 in the lower arm and a power source voltage during power running and regeneration.

A contactor 12 is a switch that switches between interruption and conduction of electric power delivery/reception between the DC power source 9 and the control apparatus 1 of the AC rotary machine.

The microcomputer 8 includes: an abnormality detection device 13 that detects an abnormality (for example, an overcurrent flows through the switching elements) in the AC rotary machine or the control apparatus of the AC rotary machine; a first switching stop device 14 (also referred to as a "switching stop device A"), a second switching stop device 15 (also referred to as a "switching stop device B"), and a third switching stop device 16 (also referred to as a "switching stop device C"), which stop intermittently turning ON the respective switching elements; and a first arm failure detection device 17 (also referred to as an "arm failure detection device A") and a second arm failure detection device 18 (also referred to as an "arm failure detection device B"), which detect a failure of the switching elements 2 to 4 in the upper arm and the switching element 5 to 7 in the lower arm.

Figure 2:
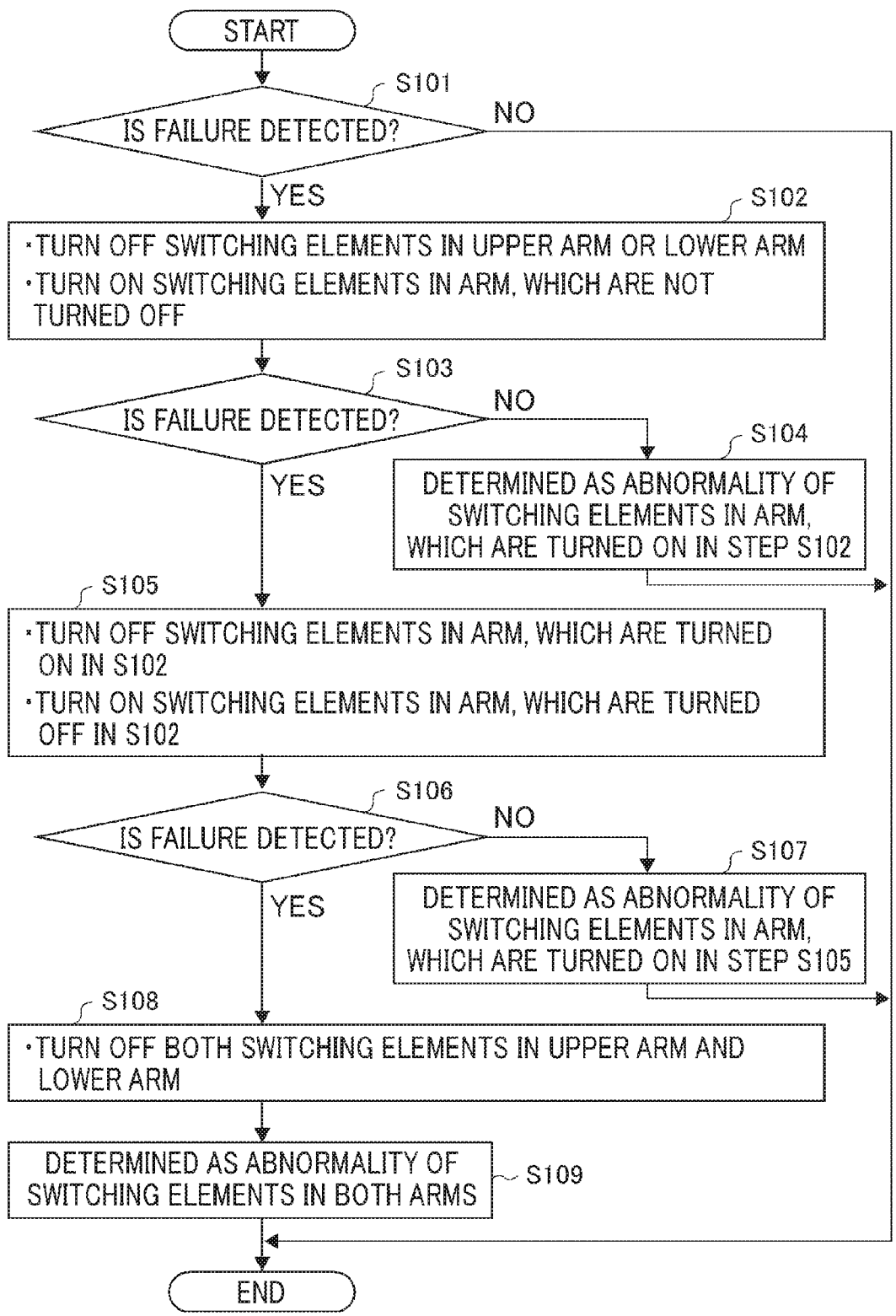
FIG. 2 is a flowchart showing processing of the control apparatus of the AC rotary machine according to Embodiment 1 of the present invention.

FIG. 2 is a flowchart showing processing of the control apparatus 1 of the AC rotary machine in Embodiment 1 of the present invention and the processing is processed in the microcomputer 8. Here, although the processing is processed in the microcomputer 8, it may be constituted by a hardware circuit such as a logic circuit.

Hereinafter, the control apparatus of the AC rotary machine according to Embodiment 1 of the present invention will be described with reference to the flowchart of FIG. 2.

First, in Step S101, a determination is made as to whether or not a failure is detected.

In Embodiment 1, as the failure, operation will be described as a case where a short circuit failure (a turn-ON state is maintained) occurs in at least any one of the switching elements in the upper arm or the lower arm.

For example, if the short circuit failure occurs in the switching element 2 in the upper arm, the DC power source 9 or the smoothing capacitor 11 is short-circuited by a circuit in the control apparatus 1 of the AC rotary machine each time the switching element 5 in the lower arm is controlled to be intermittently turned ON, and an overcurrent flows through the switching element 2 in the upper arm and the switching element 5 in the lower arm. The overcurrent is detected by a pre-driver integrated circuit (IC) (not shown in the drawing) provided with a function that detects the overcurrent, by determining as to whether or not a terminal voltage of the switching element (for example, in the case of a MOSFET, a large current flows between a drain and a source if the overcurrent occurs and accordingly a potential difference between the drain and the source increases) is equal to or more than a predetermined value.

In Step S101, when the determination is made that the failure is detected by intermittently detecting the overcurrent, the processing proceeds to Step S102. This failure detection step is performed by the abnormality detection device 13 in FIG. 1. In Step S101, when the determination is made that the failure is not detected, a determination is made that all of the switching elements are in a normal operation state and the processing is terminated.

In Step S102, a command that turns OFF all of the switching elements in one arm of either the upper arm or the lower arm is outputted from the microcomputer 8. Further, a command that turns ON all of the switching elements, which are not turned OFF, is outputted from the microcomputer 8. This command is performed as a first switching stop step by the first switching stop device 14 in FIG. 1. After that, the processing proceeds to Step S103 and a determination is made as to whether or not the failure is detected. This failure detection step is performed by the abnormality detection device 13 in FIG. 1.

In Step S103, when the determination is made that the failure is detected, the processing proceeds to Step S105. In Step S103, when the determination is made that the failure is not detected, the processing proceeds to Step S104. In Step S104, a determination is made that the abnormality occurs in at least one of the switching elements in the arm on the side, which are turned ON in Step S102, and the processing is terminated. This determination is performed as a first arm failure detection step by the first arm failure detection device 17 in FIG. 1.

In Step S105, a command that turns OFF all of the switching elements in the arm, which are turned ON in Step S102, is outputted from the microcomputer 8. Further, a command that turns ON all of the switching elements in the arm, which are turned OFF in Step S102, is outputted from the microcomputer 8. This command is performed as a second switching stop step by the second switching stop device 15 in FIG. 1. After that, the processing proceeds to Step S106 and a determination is made as to whether or not the failure is detected. This failure detection step is performed by the abnormality detection device 13 in FIG. 1.

In Step S106, when the determination is made that the failure is detected, the processing proceeds to Step S108. In Step S106, when the determination is made that the failure is not detected, the processing proceeds to Step S107. In Step S107, a determination is made that the abnormality occurs in at least one of the switching elements in the arm on the side, which are turned ON in Step S105, and the processing is terminated. This determination is performed as the first arm failure detection step by the first arm failure detection device 17 in FIG. 1.

In Step S108, a command that turns OFF all of the switching elements in the upper arm and the lower arm is outputted from the microcomputer 8. This command is performed as a third switching stop step by the third switching stop device 16 in FIG. 1. After that, the processing proceeds to Step S109, a determination is made that the abnormality occurs in at least one of the switching elements in the upper arm and the abnormality occurs in at least one of the switching elements in the lower arm (determined as the abnormality of the switching elements in both arms). This determination is performed as a second arm failure detection step by the second arm failure detection device 18 in FIG. 1.

As described above, according to this embodiment, the abnormality detection is performed in each of the first switching stop step by the first switching stop device 14, the second switching stop step by the second switching stop device 15, and the third switching stop step by the third switching stop device 16, whereby there can be prevented a continuous short-circuit of the DC power source due to a simultaneous turn-ON of the switching elements in the upper arm and the lower arm in the case of being brought into a three phase short circuit state. Furthermore, a detection as to which is abnormal, the switching elements in the upper arm or the switching elements in the lower arm, can be performed. Furthermore, there can be performed a detection as to which switching elements are abnormal, the switching elements in the upper arm or the switching elements in the lower arm.

The present invention is not limited to the aforementioned embodiment, but the embodiment can be appropriately changed within the scope of the present invention.

What is claimed is:

1. A control apparatus of an AC rotary machine, the control apparatus comprising:
    an electric power converter which has switching elements connected to an upper arm and switching elements connected to a lower arm, and supplies a drive current to each phase of said AC rotary machine; and
    an abnormality detection device that detects an abnormality in said AC rotary machine or said control apparatus of said AC rotary machine,
    wherein the control apparatus includes:
        a first switching stop device in which when the abnormality is detected by said abnormality detection device, all of a plurality of said switching elements connected to one arm of either the upper arm or the lower arm are turned OFF and all of the plurality of said switching elements connected to the arm, which are not turned OFF, are turned ON; and
        a second switching stop device in which when the abnormality is continuously detected by said abnormality detection device even after operating said first switching stop device, said switching elements connected to the upper arm and the lower arm are turned ON or turned OFF so that the turn-ON and the turn-OFF are reversed to the operation by said first switching stop device.

2. The control apparatus of the AC rotary machine according to claim 1,
    further comprising a first arm failure detection device which determines whether a failure occurs in said switching elements in the upper arm or a failure occurs in said switching elements in the lower arm according to that the abnormality is not detected by said abnormality detection device either when said first switching stop device is operated or when said second switching stop device is operated.

3. The control apparatus of the AC rotary machine according to claim 1,
    further comprising a third switching stop device that turns OFF all of said switching elements in the upper arm and the lower arm when the abnormality is continuously detected by said abnormality detection device even after operating said second switching stop device.

4. The control apparatus of the AC rotary machine according to claim 3,
    further comprising a second arm failure detection device which determines that the failure occurs in both of said switching elements in the upper arm and the lower arm when said third switching stop device is operated.

5. The control apparatus of the AC rotary machine according to claim 1,
    wherein said abnormality detection device detects an overcurrent of said switching elements.

6. A control method of an AC rotary machine by a control apparatus of said AC rotary machine including an electric power converter and an abnormality detection device, which controls an AC rotary machine by controlling the electric power converter which has switching elements connected to an upper arm and switching elements connected to a lower arm, and supplies a drive current to each phase of said AC rotary machine,
    wherein the control method includes:
        a first switching stop step in which when an abnormality in said AC rotary machine or said control apparatus of said AC rotary machine is detected by the abnormality detection device, all of a plurality of said switching elements connected to one arm of either the upper arm or the lower arm are turned OFF and all of the plurality of said switching elements connected to the arm, which are not turned OFF, are turned ON, by a first switching stop device;
        a second switching stop step in which when the abnormality is continuously detected even after operating said first switching stop step, said switching elements connected to the upper arm and the lower arm are turned ON or turned OFF so that the turn-ON and the turn-OFF are reversed to the operation by said first switching stop step, by a second switching stop device; and
    a third switching stop step in which when the abnormality is continuously detected even after operating said second switching stop step, all of said switching elements in the upper arm and the lower arm are turned OFF by a third switching stop device.

7. The control method of the AC rotary machine according to claim 6,
    further comprising a first arm failure detection step which determines whether a failure occurs in said switching elements in the upper arm or a failure occurs in said switching elements in the lower arm according to that the abnormality is not detected by either when said first switching stop step is operated or when said second switching stop step is operated.

8. The control method of the AC rotary machine according to claim 6,
    further comprising a second arm failure detection step which determines that the failure occurs in both of said switching elements in the upper arm and the lower arm when said third switching stop step is operated.

9. The control method of the AC rotary machine according to claim 6,
    wherein the control method includes detecting an overcurrent of said switching elements by the abnormality detection device.

* * * * *